United States Patent [19]

Van Bruggen

[11] Patent Number: 5,368,874
[45] Date of Patent: Nov. 29, 1994

[54] METHOD FOR MANUFACTURING INTERMEDIATE PRODUCTS FOR PREPARATION OF ANIMAL FEEDS

[75] Inventor: Jakob Van Bruggen, Hendrik Ido Ambacht, Netherlands

[73] Assignee: Schouten Group N.V., Giessen, Netherlands

[21] Appl. No.: 36,062

[22] Filed: Mar. 23, 1993

[51] Int. Cl.$^5$ .......................... A23K 3/00; A23L 1/00
[52] U.S. Cl. .................... 426/466; 426/520; 426/524; 426/623; 426/630
[58] Field of Search ............... 426/465, 466, 467, 520, 426/623, 630, 524; 34/13; 99/470

[56] References Cited

U.S. PATENT DOCUMENTS

| | | | |
|---|---|---|---|
| 2,522,342 | 9/1950 | Byers | 263/1 |
| 3,257,209 | 6/1966 | Lewis | 426/630 |
| 3,391,000 | 7/1968 | Mustakas et al. | 426/630 |
| 3,774,315 | 11/1973 | Schmalfeld et al. | 34/13 |
| 4,067,120 | 1/1978 | Bradford | 34/65 |
| 4,797,136 | 1/1989 | Siddoway et al. | 34/13 |
| 4,973,484 | 11/1990 | Pierik | 426/457 |

FOREIGN PATENT DOCUMENTS 652893 12/1985 Switzerland .

OTHER PUBLICATIONS

Bakker–Arkema, Farmer and Lerew, "Optimum Grain Dryer Design Through Simulation," *Annales de Technologie Agricole*, 1973, vol. 22(3), pp. 275–290.

*Primary Examiner*—George Yeung
*Attorney, Agent, or Firm*—Webb Ziesenheim Bruening Logsdon Orkin & Hanson

[57] ABSTRACT

A method for manufacturing intermediate products for preparation of animal feeds comprising the steps of: (a) heating a crude granular raw material in a vessel containing a heating device at a temperature sufficient to toast the raw material; (b) feeding the toasted crude raw material from the vessel to a container; (c) cooling the toasted raw material within the container by contacting the toasted raw material with cold air in counterflow to the feeding of the toasted raw material in order to heat and moisten the cold air and to cool and dry the raw material so as to obtain the intermediate products; and (d) feeding the heated moist air back to the vessel thereby recovering the energy from the heating step (a).

9 Claims, 1 Drawing Sheet

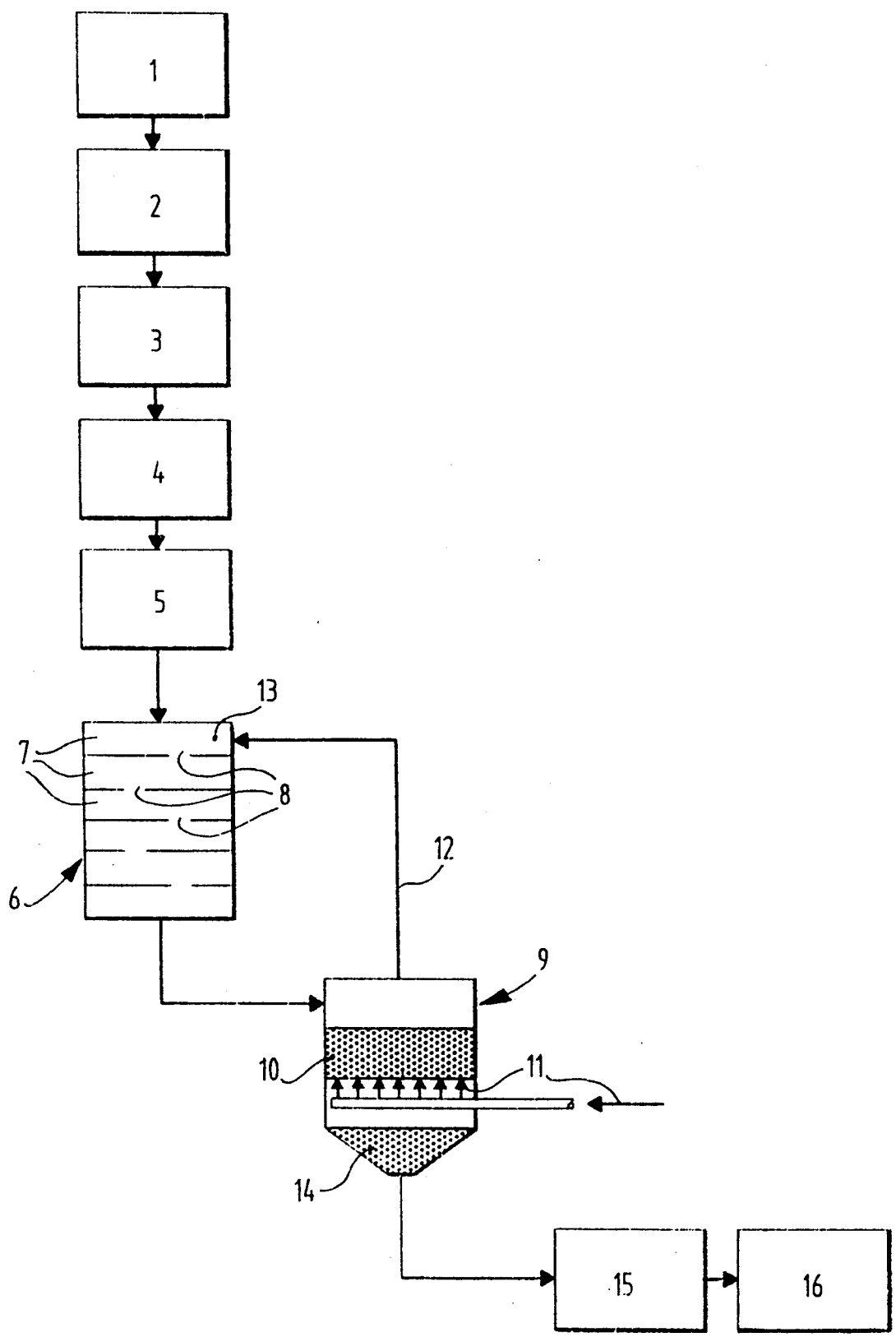

METHOD FOR MANUFACTURING INTERMEDIATE PRODUCTS FOR PREPARATION OF ANIMAL FEEDS

BACKGROUND OF THE INVENTION

The invention relates to a method and device for manufacturing intermediate products for preparation of animal feeds.

Raw materials for animal feeds, such as for instance soya beans, often contain so-called anti-nutritional factors which have an adverse effect on the nutritional value of the raw material. In order to eliminate such factors, the raw materials are subjected to a heating process, so-called "toasting". Herein the raw materials are heated to a minimum of 100° C. by means of direct steam injection in a toaster. The same method is also used for instance in the opening up of cereals, peas and fodder beans, whereby the nutritional value of the raw materials is improved. After the treatment the raw materials, if required following a final processing, are dried with partially pre-heated air. They are then cooled by means of cold air and optionally subjected to a second after-treatment to obtain the intermediate products. The air from the cooler and the dryer disappears to the outside via cyclones. A significant amount of energy and moisture is lost herein.

It is therefore important to recover the greatest possible amount of energy. According to the customary methods energy is recovered by means of porous link or belt conveyors on which the product lies and through which a large amount of air is blown. The air absorbs the heat from the product and its temperature becomes the mean temperature of the inblown air and the product. The consequence is that no optimum heat transfer takes place. An additional problem is that the air speeds are so great that large quantities of product and dust are carried along therewith. The air hereby becomes unsuitable for re-use.

SUMMARY OF THE INVENTION

The present invention has for its object to provide a method and device for manufacturing intermediate products for preparation of animal feeds with which energy and moisture from the heating process can be recovered and re-used. This is achieved by the invention by
 i) feeding the heated crude raw material from the heating device to a container;
 ii) placing the heated raw material in contact with cold air in counterflow to the feed of the heated raw material in order to heat and moisten the cold air and to cool and dry the raw material;
 iii) feeding the heated moist air back to the heating device.

Because the cold air is placed in a measured amount in counterflow contact with the heated raw material, heat and moisture transfer will be optimal. The raw material with the lowest temperature is situated at the bottom of the container where the air with the lowest temperature also enters. Because there is still a difference in temperature between raw material and air, heat will be transferred. The air becomes gradually a little warmer but on its way through the heated raw material stored in the container will always have a lower temperature than the raw material with which it comes into contact. The result is a continuous heat transfer and thereby an optimum energy recovery. The same is true for the transfer of moisture.

In preference air is used with a low temperature, preferably 10°–30° C., preferably ambient temperature. The advantage of using ambient temperature is that cooling and/or heating steps are unnecessary.

The heated air preferably has a humidity of approximately 100%.

The heat recovery process is preferably continuous. This requires that both the raw material feed and the raw material discharge to and respectively from the container take place continuously.

The method according to the invention can include a further number of extra steps in addition to the heating process, recovery of energy and final processing. The crude raw material can for instance be reduced in size prior to heating. In particular cases contaminants will be removed from the crude raw material prior to reduction in size and/or heating.

The present invention likewise relates to a system of devices for applying the method according to the invention. Such a device comprises a heating device, means for feeding the crude raw material to the heating device, a container for temporary storage of the heated raw material, discharge means and feed means for the heated raw material from and respectively to the heating device and the container, means for supplying cold air to the heated raw material stored in the container in counterflow to the feed of the heated raw material, discharge means and feed means for the cooled raw material from and respectively to the container and a final processing device, and means for discharging heated air to the heating device. The system can optionally contain a reducing device and/or a cleaning device. The supply means for cold air are preferably formed by a fan. In general the feed means and discharge means for raw material are transport elevators, mass conveyors and worms.

The means for discharging heated, moist air preferably comprise a suction fan on the side of the container and a blowing fan on the side of the heating device.

The method is suitable for a large number of raw materials, for instance soya beans, fodder beans, peas, cereals, rape seed and broad beans. The method is not however limited to these named raw materials.

The method and device according to the invention are significantly energy-saving. The toasted raw material has a temperature of a minimum of 100° C. When the temperature of the incoming cold air amounts to 20° C. the raw material will be cooled to 40° C. The temperature of the air leaving the container will then amount to 80° C. This exiting air is used to heat the crude raw material in the heating device. Operation at comparatively low air speeds prevents the raw material and dust being carried along in the air flow.

BRIEF DESCRIPTION OF THE DRAWING

The invention is elucidated with reference to the annexed figure which shows a schematic view of the method and device according to the present invention.

DESCRIPTION OF THE PREFERRED EMBODIMENT

The crude product 1 is cleaned 2 and subsequently stored 3. From this interim storage 3 the product is pre-treated in a reducing device 4. The pre-treated product is stored once again. The raw material is heated in heating device 6, the so-called toaster. Such a toaster consists for instance of six compartments 7 mutually connected by means of openings 8 in the bottom. The raw material, introduced into the top of the toaster, thus proceeds slowly on its downward path. When the raw material has passed through the toaster it is stored in a container 9. The heated product 10 is cooled therein by means of inflowing cold air 11. The air is in contact with the heated product whereby heat is transferred. The air leaving the container at 12 is returned to the first compartment 13 of toaster 6 and is there used to heat the raw material. The cooled product 14 undergoes then a final processing 15, whereafter the intermediate product for animal feeds 16 is obtained. All or some of the steps 2, 3, 4, 5 and 15 can, if desired, be omitted.

I claim:

1. A method for manufacturing intermediate products for preparation of animal feeds comprising the steps of:
    a) heating a crude granular raw material in a vessel containing a heating device at a temperature sufficient to toast the raw material;
    b) feeding the toasted crude raw material from the vessel to a container;
    c) cooling the toasted raw material within the container by contacting the toasted raw material with cold air in counterflow to the feeding of the toasted raw material in order to heat and moisten the cold air and to cool and dry the raw material so as to obtain the intermediate products; and
    d) feeding the heated moist air back to the vessel thereby recovering the energy from the heating step a).

2. A method as claimed in claim 1, wherein the temperature of the cold air amounts to 10°-30° C.

3. A method as claimed in claim 2, wherein the temperature of the cold air is ambient temperature.

4. A method as claimed in claim 1, wherein the heated air has a humidity of approximately 100%.

5. A method as claimed in claim 1 further comprising discharging the cooled raw material from the container, wherein feeding the toasted raw material to the container and discharging the cooled raw material from the container take place continuously.

6. A method as claimed in claim 1, wherein the raw material is selected from the group consisting of soya beans, fodder beans, cereals, peas, rape seed and broad beans.

7. A method as claimed in claim 6, wherein the heating step a) is carried out at a temperature of at least 100° C.

8. A method as claimed in claim 1 further comprising reducing prior to step a) the crude raw material in size.

9. A method as claimed in claim 2 further comprising reducing in size the crude raw material prior to heating the crude granular raw material in the vessel.

* * * * *